US011321076B2

(12) United States Patent
Lessiak et al.

(10) Patent No.: US 11,321,076 B2
(45) Date of Patent: May 3, 2022

(54) SYSTEM AND METHOD FOR APPLYING PATCHES TO EXECUTABLE CODES

(71) Applicant: NXP B.V., Eindhoven (NL)

(72) Inventors: Andreas Lessiak, Graz (AT); Mark Leonard Buer, Payson, AZ (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/841,109

(22) Filed: Apr. 6, 2020

(65) Prior Publication Data

US 2020/0326929 A1    Oct. 15, 2020

(30) Foreign Application Priority Data

Apr. 12, 2019 (EP) ..................... 19169052

(51) Int. Cl.
*G06F 9/44* (2018.01)
*G06F 8/656* (2018.01)
*G06F 9/445* (2018.01)

(52) U.S. Cl.
CPC .......... *G06F 8/656* (2018.02); *G06F 9/44563* (2013.01); *G06F 9/44589* (2013.01)

(58) Field of Classification Search
None
See application file for complete search history.

(56) References Cited

U.S. PATENT DOCUMENTS

| 10,019,569 | B2 | 7/2018 | Islam et al. | |
|---|---|---|---|---|
| 2011/0107312 | A1 | 5/2011 | Siedel | |
| 2013/0283257 | A1* | 10/2013 | Sen | G06F 8/656 |
| | | | | 717/173 |
| 2015/0172255 | A1* | 6/2015 | Warnez | H04W 12/04 |
| | | | | 713/168 |
| 2015/0334126 | A1 | 11/2015 | Mooring et al. | |
| 2017/0003954 | A1* | 1/2017 | Khan | H04L 9/3247 |
| 2019/0004786 | A1 | 1/2019 | Pirzadeh et al. | |
| 2019/0034186 | A1* | 1/2019 | Franchi | G06F 8/65 |
| 2019/0163467 | A1* | 5/2019 | Aabye | H04W 12/35 |
| 2019/0258475 | A1* | 8/2019 | Pirzadeh | G06F 8/65 |
| 2019/0391857 | A1* | 12/2019 | McKenney | G06F 9/528 |
| 2020/0050491 | A1* | 2/2020 | Kulkarni | H04W 4/80 |
| 2020/0272446 | A1* | 8/2020 | Koo | H04W 8/22 |

FOREIGN PATENT DOCUMENTS

| CN | 102722387 B | 7/2015 |
|---|---|---|
| EP | 3 324 655 A1 | 5/2018 |

\* cited by examiner

*Primary Examiner* — Insun Kang (57) ABSTRACT

In accordance with a first aspect of the present disclosure, a system is provided for applying patches to executable codes, comprising: a plurality of execution environments configured to execute said codes in different execution contexts; a control unit configured to apply the patches to said codes; wherein the control unit is configured to apply a specific patch to a specific code upon or after an execution environment configured to execute said specific code switches to an execution context corresponding to said specific code. In accordance with other aspects of the present disclosure, a corresponding method is conceived for applying patches to executable codes, and a corresponding computer program is provided.

16 Claims, 5 Drawing Sheets

SYSTEM AND METHOD FOR APPLYING PATCHES TO EXECUTABLE CODES

CROSS-REFERENCE TO RELATED APPLICATIONS

This application claims priority under 35 U.S.C. § 119 to European Patent Application No. 19169052.8, filed on Apr. 12, 2019, the contents of which are incorporated by reference herein.

TECHNICAL FIELD

The present disclosure relates to a system for applying patches to executable codes. Furthermore, the present disclosure relates to a corresponding method for applying patches to executable codes, and to a corresponding computer program.

BACKGROUND

Mobile devices, such as smartphones, may contain several execution environments in which executable codes are executed. For instance, a mobile phone typically contains a so-called embedded Universal Integrated Circuit Card (eUICC) and an embedded Secure Element (eSE). An eUICC—which may also be referred to as an embedded Subscriber Identity Module (eSIM)—is a secure element designed to remotely manage multiple mobile network operator subscriptions and to be compliant with GSMA specifications. An eSE is a tamper-resistant chip, which may be embedded in any mobile device. In particular, a secure element (SE) may be a tamper-resistant integrated circuit with installed or pre-installed smart-card-grade applications, for instance payment applications, which have a prescribed functionality and a prescribed level of security. Furthermore, a secure element may implement security functions, such as cryptographic functions and authentication functions. The different execution environments of a mobile device often execute applications which are unrelated to each other. For instance, the eUICC may execute applications related to mobile network communications, while the eSE may execute applications related to Near Field Communication (NFC) transactions.

SUMMARY

In accordance with a first aspect of the present disclosure, a system is provided for applying patches to executable codes, comprising: a plurality of execution environments configured to execute said codes in different execution contexts; a control unit configured to apply the patches to said codes; wherein the control unit is configured to apply a specific patch to a specific code upon or after an execution environment configured to execute said specific code switches to an execution context corresponding to said specific code.

In an embodiment, the system further comprises a mapping between execution contexts and patches, wherein the control unit is configured to determine the specific patch to be applied by selecting a patch activated for the execution context according to said mapping.

In an embodiment, the patches are stored in memory locations different from the memory locations in which the codes are stored.

In an embodiment, the control unit is further configured to generate checksums on the codes and the patches.

In an embodiment, the control unit is further configured to apply shared patches, said shared patches being shared by a plurality of codes in a specific execution context.

In an embodiment, the control unit is configured to apply the shared patches by loading the patches into memory locations which are shared by the codes in the specific execution context.

In an embodiment, the control unit is a hypervisor or a common operating system.

In an embodiment, the execution environments include at least an embedded Universal Integrated Circuit Card (eUICC) and an embedded Secure Element (eSE).

In an embodiment, the execution environments include operating systems, and the patches include patches of one or more codes executable by said operating systems.

In an embodiment, the codes include applets, and the patches include patches of said applets.

In accordance with a second aspect of the present disclosure, a method is conceived for applying patches to executable codes, comprising: executing said codes by a plurality of execution environments in different execution contexts; applying, by a control unit, the patches to said codes; applying, by the control unit, a specific patch to a specific code upon or after an execution environment configured to execute said specific code switches to an execution context corresponding to said specific code.

In an embodiment, the execution contexts are mapped to the patches, and the control unit determines the specific patch to be applied by selecting a patch activated for execution context according to the mapping.

In an embodiment, the patches are stored in memory locations different from the memory locations in which the codes are stored.

In an embodiment, the control unit generates checksums on the codes and the patches.

In accordance with a third aspect of the present disclosure, a computer program is provided, comprising executable instructions that, when executed by a control unit, carry out a method of the kind set forth.

DESCRIPTION OF DRAWINGS

Embodiments will be described in more detail with reference to the appended drawings, in which.

DESCRIPTION OF EMBODIMENTS

Mobile devices, such as smartphones, may contain several execution environments in which executable codes are executed. For instance, a mobile phone typically contains a so-called embedded Universal Integrated Circuit Card (eUICC) and an embedded Secure Element (eSE). An eUICC—which may also be referred to as an embedded Subscriber Identity Module (eSIM)—is a secure element designed to remotely manage multiple mobile network operator subscriptions and to be compliant with GSMA specifications. An eSE is a tamper-resistant chip, which may be embedded in any mobile device. In particular, a secure element (SE) may be a tamper-resistant integrated circuit with installed or pre-installed smart-card-grade applications, for instance payment applications, which have a prescribed functionality and a prescribed level of security. Furthermore, a secure element may implement security functions, such as cryptographic functions and authentication functions. The different execution environments of a mobile device often execute applications which are unrelated to each other. For instance, the eUICC may execute applications related to mobile network communications, while the eSE may execute applications related to Near Field Communication (NFC) transactions.

Besides a common operating system containing executable code, such as a Java Card (JC) operating system which can be shared by several execution environments, each execution environment may also contain dedicated executable code, such as a Java Virtual Machine and GlobalPlatform (GP) code. Furthermore, the JC operating system may contain a kernel, flash libraries and drivers, for example. Each of these components includes executable code, which sometimes needs to be patched. For security reasons, however, this code should be certified before it is used. This security certification is costly and time-consuming. Therefore, the security certification should not be performed too often.

Nowadays, devices that include secure elements integrate a lot of functionality in the operating system. Furthermore, service providers—such as payment service providers— may require a certification of both the operating system and the payment applets. After certification the code of the operating system cannot be changed anymore without a recertification. Thus, patches of the code will also require a recertification. Furthermore, if the certificate of an operating system changes, the applets executed on this operating system should also be recertified. As a consequence, the functional testing of the applets should also be repeated. Since typically multiple applets should be certified, this is costly and time-consuming. Now a system and a method for applying patches are described, which may reduce the need for a recertification of the kind set forth.

Figure 1:
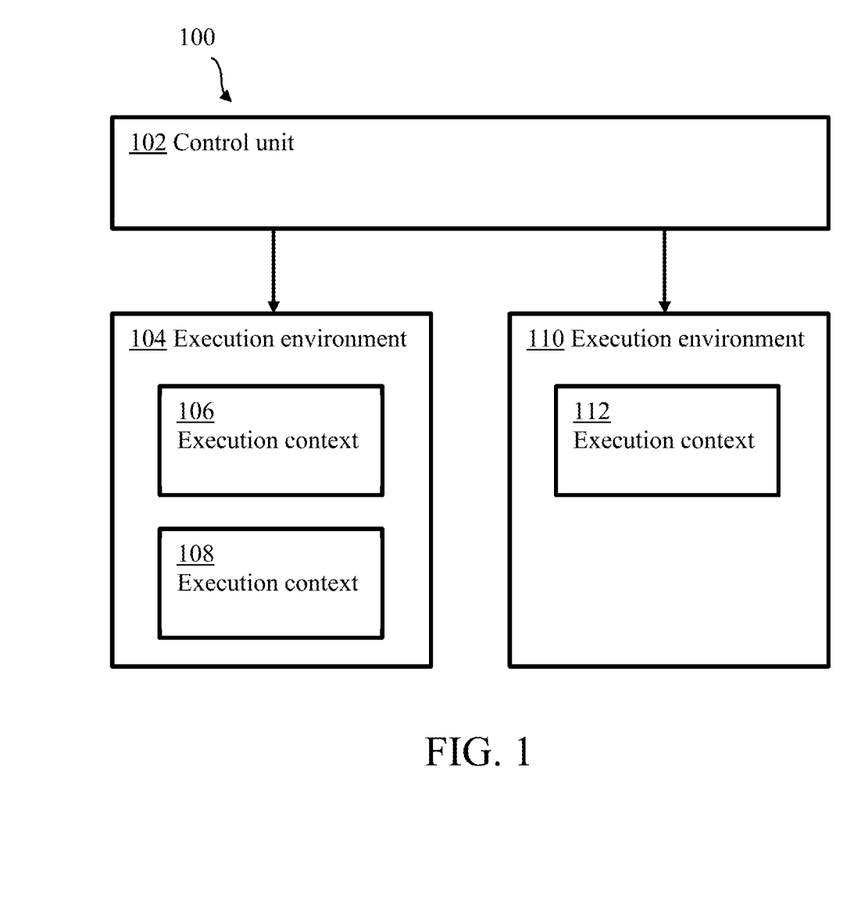
FIG. 1 shows an illustrative embodiment of a system for applying patches to executable codes.

FIG. 1 shows an illustrative embodiment of a system 100 for applying patches to executable codes. The system 100 comprises a plurality of execution environments 104, 110 configured to execute the codes in different execution contexts 106, 108, 112. In other words, each execution environment 104, 110 may execute codes in one or more execution contexts 106, 108, 112. Examples of the execution contexts are a payment context and a public transit context, in which different applets are executed and for which specific operating system resources are reserved. Furthermore, the system 100 comprises a control unit 102 operatively coupled to the execution environments 104, 110. The control unit 102 is configured to apply the patches to the codes. Furthermore, the control unit 102 is configured to apply a specific one of said patches to a specific one of said codes upon or after an execution environment configured to execute the specific code switches to an execution context corresponding to the specific code. In this way, the patches can be applied dynamically for targeted contexts. It is noted that a patch may be a small piece of code inserted into a program to improve its functioning or to correct a fault, or, in more general terms, any code that modifies or updates existing code.

In particular, an operating system will switch between different execution contexts, to facilitate the execution of specific codes (e.g., operating system code and applets). The switching to a particular context is used as a trigger for applying a specific patch to the code executed in that context. This patch is not applied to code executed in other contexts. Therefore, the code executed in other contexts does not change, and does not need to be recertified. It is noted that a context refers to a set of allocated resources, for example a set of loaded variables and/or reserved memory locations, for executing applications within said context. For instance, each context may have a reserved memory space and may have reserved hardware resources (e.g. peripheral access). In this sense, each context may have a dedicated non-volatile and volatile memory space. Applets that are executed are also specific to a context. Thus, if an applet is loaded in one context it can typically not be executed in another context, unless it is loaded into the other context. Global variables may be context-specific as well, and if needed they may be duplicated so that each context has its own variables. It is noted that different contexts may share the same code, but typically they will not share data.

In an embodiment, the system 100 further comprises a mapping between execution contexts and patches, and the control unit 102 is configured to determine the specific patch to be applied by selecting a patch activated for the execution context 106, 108, 112 according to the mapping. In this way, it becomes easier to apply the patches dynamically for targeted contexts. The mapping may for example be realized as a table or a list or as another representation. In a practical and effective implementation, the control unit 102 may contain such a table or list.

In an embodiment, the patches are stored in memory locations different from the memory locations in which the codes are stored. In this way, the original code is not overwritten, and the risk that a code belonging to another context is affected by a patch for the targeted context is small. Furthermore, in an embodiment, the control unit 102 is configured to generate checksums on the codes and the patches. In this way, it can be proven that codes belonging to contexts other than the targeted context have not been changed. This, in turn, may be sufficient for avoiding a recertification of these codes.

In an embodiment, the control unit 102 is further configured to apply shared patches. These patches are shared by a plurality of codes in a specific execution context. For instance, not only a payment context and a public transit context may be distinguished, but also a complete eSE or eUICC may be regarded as a higher-level execution context. In that case, a shared patch could be applied to all codes in a given context. This shared patch can also be applied dynamically. In a practical and effective implementation, the control unit 102 is configured to apply the shared patches by loading them into memory locations which are shared by the codes in the specific execution context. Alternatively, the shared patches may be applied by activating them at a current memory location—i.e. without loading them into shared memory locations—for example by making use of hardware watchpoints.

In an embodiment, the control unit 102 is a hypervisor or a common operating system. A hypervisor results in a practical and effective implementation. A hypervisor or virtual machine monitor (VMM) is computer software, firmware or hardware that creates and runs virtual machines. As such, it can control virtual machines in which the different execution environments are realized. The control unit 102 can also be implemented in a common operating system, such as a JC operating system kernel. As mentioned above, the execution environments may include at least an embedded Universal Integrated Circuit Card (eUICC) and an embedded Secure Element (eSE).

In an embodiment, the execution environments include operating systems, and the patches include patches of one or more codes executable by said operating systems. Alternatively, or in addition, the codes include applets, and the patches include patches of said applets.

Figure 2:
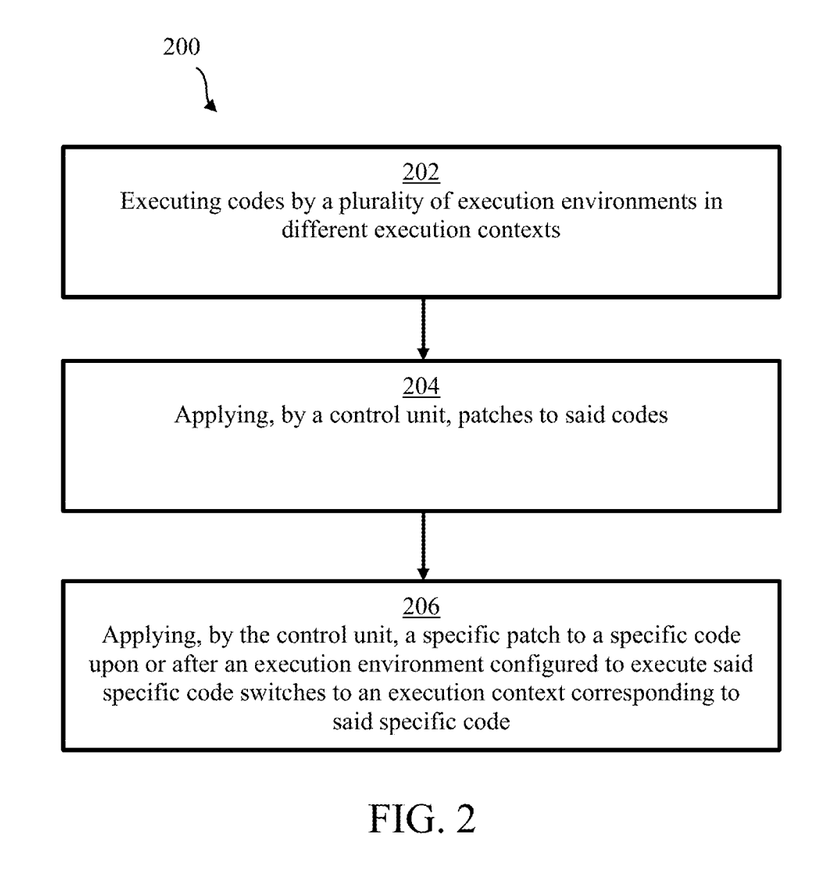
FIG. 2 shows an illustrative embodiment of a method for applying patches to executable codes.

FIG. 2 shows an illustrative embodiment of a method 200 for applying patches to executable codes. The method 200 comprises, at 202, executing codes by a plurality of execution environments in different execution contexts, at 204, applying, by a control unit, patches to said codes, and at 206 applying, by the control unit, a specific patch to a specific code upon or after an execution environment configured to execute said specific code switches to an execution context corresponding to said specific code. As mentioned above, in this way, the patches can be applied dynamically for targeted contexts.

Figure 3:
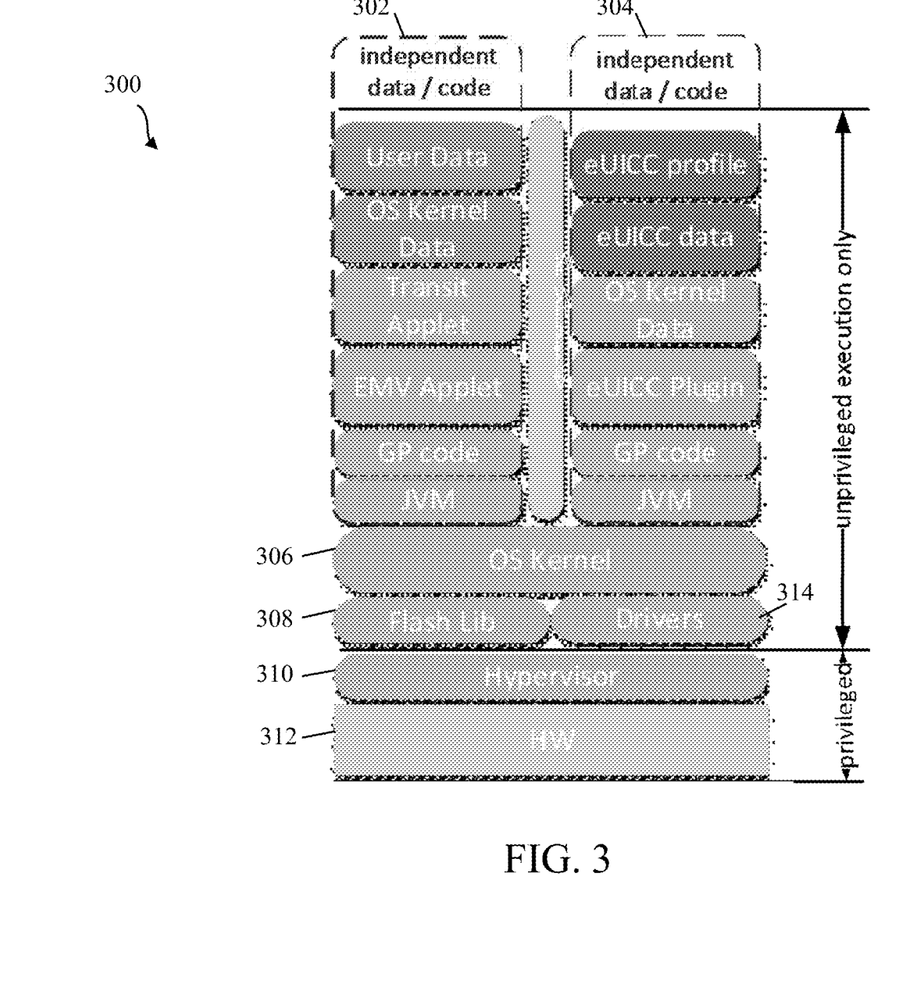
FIG. 3 shows an illustrative embodiment of a platform with a plurality of execution environments.

FIG. 3 shows an illustrative embodiment of a platform 300 with a plurality of execution environments. The execution environments contain independent data and code 302, 304, meaning that the data and code in one execution environment does not depend on the data and code in the other execution environment. In this example, the eUICC is one execution environment, containing independent data and code 304, and the eSE is another execution environment, containing independent data and code 302. The eUICC contains one execution context, i.e. for executing mobile network applications, and the eSE contains two execution contexts, one for executing public transit applications (Transit Applet) and one for executing payment applications (EMV Applet). The execution environments may also be referred to as domains. The common operating system 306, which is a JC operating system kernel in the present example, provides a separation of the eSE domain and the eUICC domain. For instance, in addition to code that is shared between the different domains, dedicated code and data may exist, i.e. code and data that are specific to—and that are only to be used in—the respective domains. In this sense, the combination of shared code and dedicated code and data for a given domain may be regarded as an independent operating system. The independent operating system of the eSE domain may for example support the execution of payment, transit, authentication, eGovernment and ultra-wideband (UWB) applications. The independent operating system of the eUICC domain may support the execution of mobile network applications. Both operating systems will work independently of each other. A hypervisor 310 manages the switching between different execution contexts. Thus, the hypervisor will have knowledge about which execution context is active at a given moment. As mentioned above, the eSE domain and the eUICC domain as a whole can be regarded as different execution contexts. In addition, different execution contexts can be distinguished within a particular domain, for example a payment context and a public transit context within the eSE domain. The hypervisor 310 is configured to manage these contexts. In such a case, the JC operating system may have to inform the hypervisor that a specific execution context becomes active in a given domain. Then, the hypervisor may enable or disable the corresponding patch or patches for this context.

Figure 4:
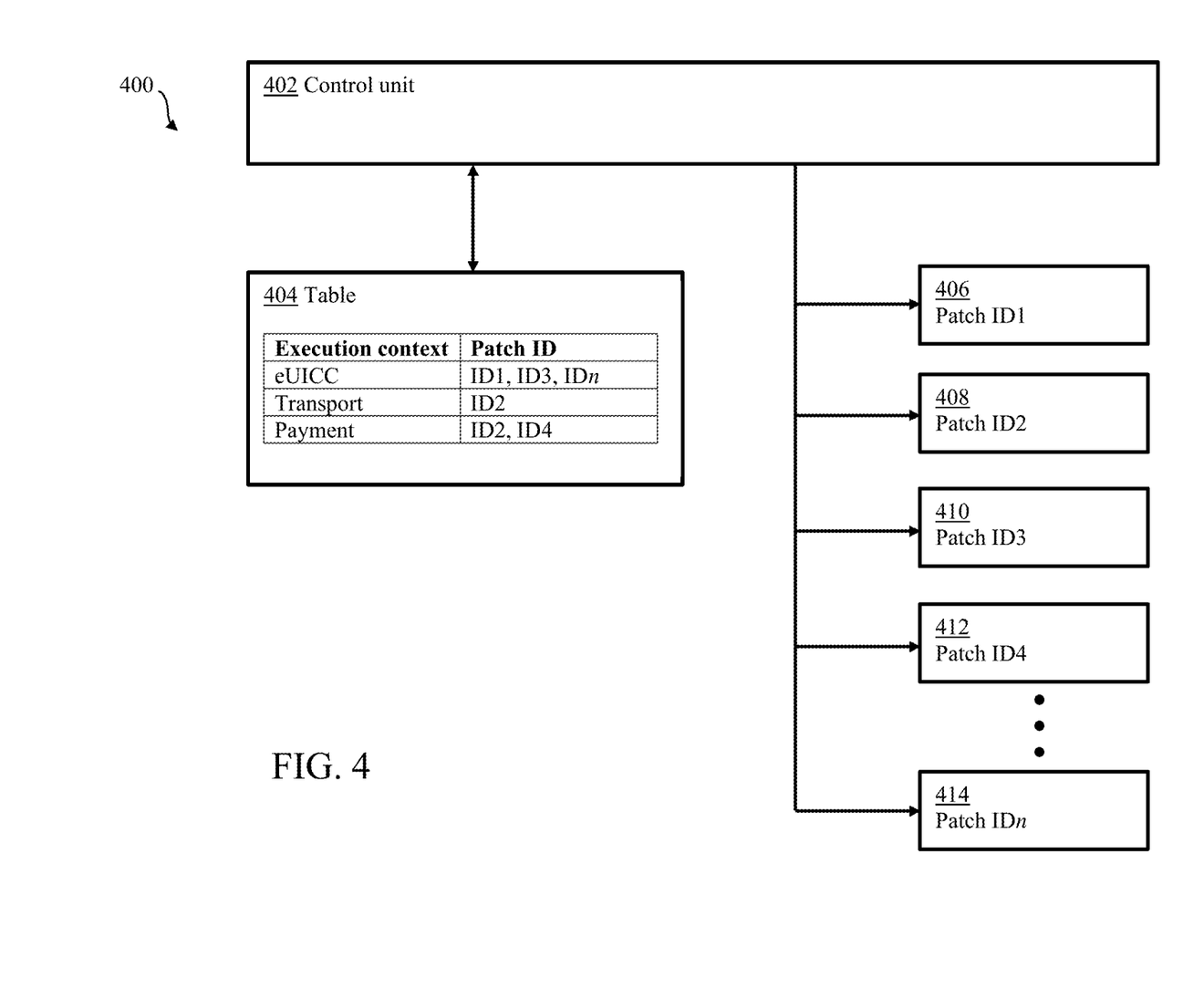
FIG. 4 shows another illustrative embodiment of a system for applying patches to executable codes.

FIG. 4 shows another illustrative embodiment of a system 400 for applying patches to executable codes. The system 400 comprises a control unit 402, a table 404 containing a mapping between execution contexts and patches, and a plurality of patches 406, 408, 410, 412, 414. At runtime, the control unit 402 can apply the patches 406, 408, 410, 412, 414 by looking up, for a given active execution context, which of the patches 406, 408, 410, 412, 414 are mapped to said active execution context. For instance, if the eUICC context is active, then the patches identified as ID1, ID2, IDn should be applied, if the transport context is active, then only the patch identified as ID2 should be applied, and the payment context is active, then the patches identified as ID2 and ID4 should be applied.

More specifically, the control unit 402 (e.g. a common operating system or a hypervisor) maintains a registry (e.g. a table) in which all the patches available in the system are mapped to one or more execution contexts. When a patch is applied to the chip, it is stored in a separate location (e.g. a dedicated Flash page) and it is assigned to one or multiple execution contexts (this is meta-information of a patch). The control unit 402 stores this information in the registry. When a context switch occurs, the control unit 402 accesses the registry and checks which patch or patches should be applied. Subsequently, the control unit 402 may apply said patch or patches.

Figure 5:
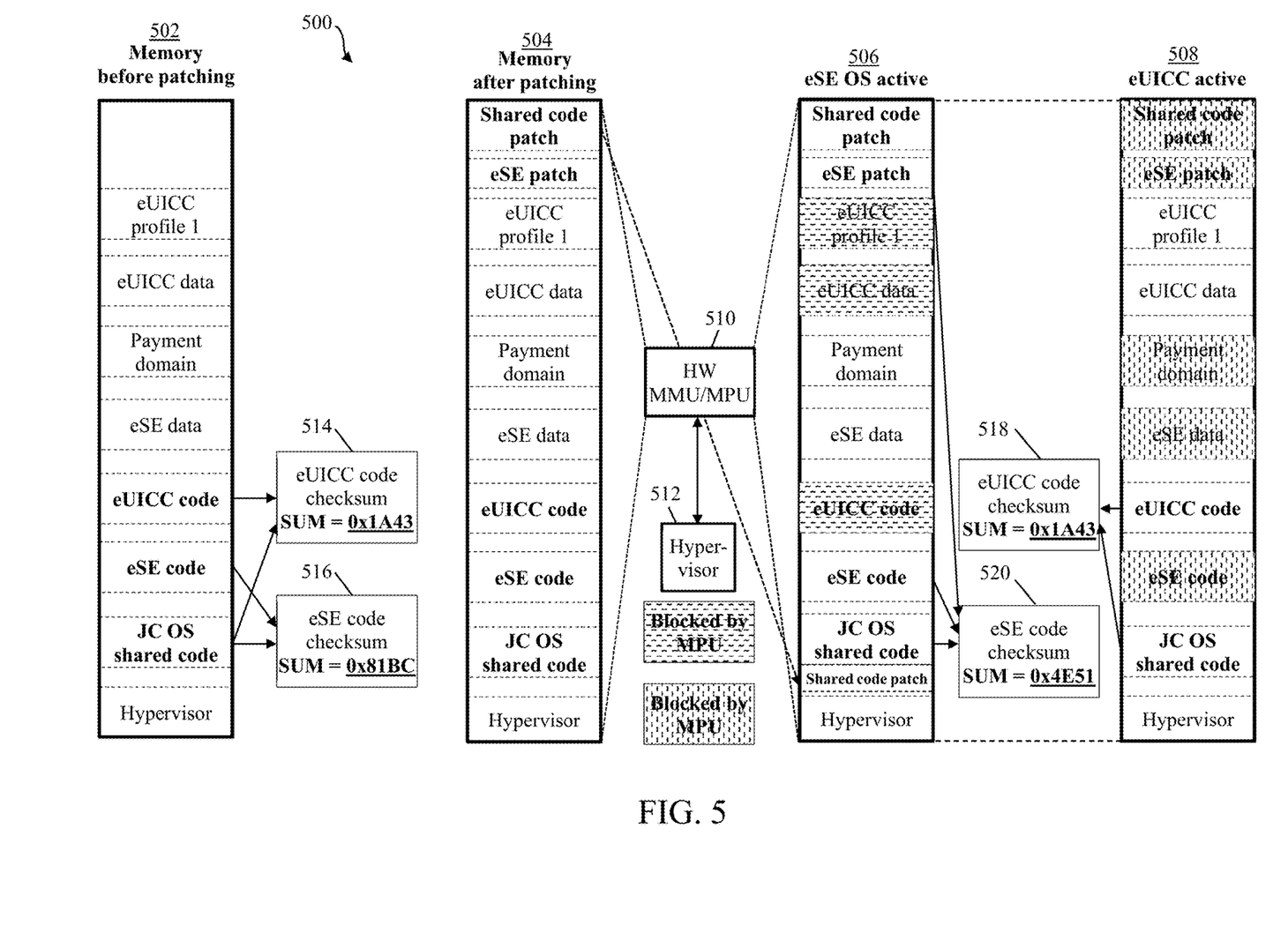
FIG. 5 shows a further illustrative embodiment of a system for applying patches to executable codes.

FIG. 5 shows a further illustrative embodiment of a system 500 for applying patches to executable codes. In particular, a state of the memory 502 before patching is shown, as well as a state of the memory 504 after patching. A shared code patch is applied to the code shared between the eSE domain and the eUICC domain, but only to the execution context "eSE as a whole". In other words, the shared code patch is not applied to the shared code if the eSE context is not active. Furthermore, a patch to the eSE code is applied. The system 500 comprises a hypervisor 512, which is configured to control a hardware-based memory management unit (MMU) or memory protection unit (MPU). As explained with reference to FIG. 4, the hypervisor 512 looks up in table which patches should be applied if the eSE context is active and applies said patches by mapping the new code into a shared memory area, for example. It is noted that there also alternative ways to activate a patch for a given context. For instance, watchpoint vectors may be used or branch tables. Furthermore, code and other data which are relevant for non-active contexts may be blocked by the MPU.

For execution contexts not using a patch, a checksum may be applied to prove that still the original certified code without modification is executed. In particular, as shown in FIG. 5, for execution contexts not using a patch, the code checksum will be the same before and after the patch. This proves that the code was not modified or patched. The checksum is calculated during runtime in the current active context. The operating system or the hypervisor 512 will support an application programming interface (API) or application protocol data unit (APDU) for this purpose. The checksum can be compared against the checksum with which the original build was certified. Each domain or context will have a dedicated checksum, e.g. one for eUICC one for eSE. If a small patch is applied, the hypervisor 512 will map the new code into the shared memory area (either via MMU or via re-sorting map-ram). This changes the code which is visible in the current domain and hence the checksum is different too. Basically, a flash page is replaced by another flash page with the new code. If the patch cannot be applied in-place it must be placed at a new location in the flash memory. However, to call this new location the original code must be modified to jump to or call the new function. This will change the checksum. So, in both cases the checksum mechanism can provide the desired proof. In addition, the hypervisor patch mechanism can include the patch code in the checksum calculation. To increase the level of security, the hypervisor checksum mechanism is also certified.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 system for applying patches to executable codes
102 control unit
104 execution environment
106 execution context
108 execution context
110 execution environment
112 execution context
200 method for applying patches to executable codes
202 executing codes by a plurality of execution environments in different execution contexts
204 applying, by a control unit, patches to said codes
206 applying, by the control unit, a specific patch to a specific code upon or after an execution environment configured to execute said specific code switches to an execution context corresponding to said specific code
300 platform with a plurality of execution environments
302 independent data/code
304 independent data/code
306 JC operating system kernel
308 flash library
310 hypervisor
312 hardware
314 drivers
400 system for applying patches to executable codes
402 control unit
404 table
406 patch ID1
408 patch ID2
410 patch ID3
412 patch ID4

414 patch IDn
500 system for applying patches to executable codes
502 memory before patching
504 memory after patching
506 eSE OS active
508 eUICC active
510 hardware including memory management unit and memory protection unit
512 hypervisor
514 eUICC code checksum
516 eSE code checksum
518 eUICC code checksum
520 eSE code checksum

The invention claimed is:

1. A system for applying patches to executable codes, the system comprising:
a plurality of execution environments configured to execute said codes in different execution contexts each of which corresponds to a respectively-associated set of reserved memory resources including non-volatile and volatile memory space;
a control unit, including a computer, configured to apply the patches to said codes and to receive indication of which of the execution contexts is active;
wherein the control unit is configured to apply a specific patch to a specific code of said codes based on the indication in response to an execution environment of the plurality of execution environments, configured to execute said specific code, switching to one of the execution contexts while using its respectively-associated set of reserved memory resources, said one of the execution contexts determined to be active and corresponding to said specific code, wherein the control unit is configured to determine the specific patch to be applied that is activated of said one of the execution contexts according to a mapping between the different execution contexts and the patches; and
wherein the execution environments are at least an embedded Universal Integrated Circuit Card and an embedded Secure Element.

2. The system of claim 1, wherein the patches are stored in memory locations different from the memory locations in which the codes are stored.

3. The system of claim 1, wherein the control unit is further configured to generate checksums on the codes and the patches.

4. The system of claim 1, wherein the control unit is a hypervisor or a common operating system.

5. The system of claim 1, wherein the execution environments include operating systems, and wherein the patches include patches of one or more codes executable by said operating systems.

6. The system of claim 1, wherein the codes include applets, and wherein the patches include patches of said applets.

7. A system for applying patches to executable codes, the system comprising:
a plurality of execution environments configured to execute said codes in different execution contexts, each of which corresponds to a respectively-associated set of reserved memory resources including non-volatile and volatile memory space;
a control unit, including a computer, configured to apply the patches to said codes;
wherein the control unit is configured to apply a specific patch to a specific code of said codes in response to an execution environment of the plurality of execution environments, and configured to execute said specific code, switching to one of the execution contexts while using its respectively-associated set of reserved memory resources, said one of the execution contexts determined to be active and corresponding to said specific code, wherein the control unit is configured to determine the specific patch to be applied that is activated for said one of the execution contexts according to a mapping between the different execution contexts and the patches; and
wherein the execution environments are at least an embedded Universal integrated Circuit Card ("eUICC") and an embedded Secure Element ("eSE"), wherein the control unit is further configured to apply shared patches, said shared patches being shared by a plurality of codes in a specific execution context.

8. The system of claim 7, wherein the control unit is configured to apply the shared patches by loading the shared patches into memory locations which are shared by the codes in the specific execution context.

9. A method for applying patches to executable codes, the method comprising:
executing said codes by a plurality of execution environments in different execution contexts each of which corresponds to a respectively-associated set of reserved memory resources including non-volatile and volatile memory space;
applying, by a control unit, including a computer, the patches to said codes and using the control unit to track which of the execution contexts is active;
applying, by the control unit, a specific patch to a specific code of said codes in response to an execution environment of the plurality of execution environments, configured to execute said specific code, switching to one of the execution contexts while using its respectively-associated set of reserved memory resources, said one of the execution contexts determined to be active and corresponding to said specific code, wherein the control unit is configured to determine the specific patch to be a applied that is activated for said one of the execution contexts according to a mapping between the different execution contexts and the patches; and
wherein the execution environments are at least an embedded Universal Integrated Circuit Card and an embedded Secure Element.

10. The method of claim 9, wherein the patches are stored in memory locations different from the memory locations in which the codes are stored.

11. The method of claim 9, wherein the control unit generates checksums on the codes and the patches.

12. The method of claim 9, wherein the control unit applies shared patches, said shared patches being shared by a plurality of codes in a specific execution context.

13. The method of claim 12, wherein the control unit applies the shared patches by loading the patches into memory locations which are shared by the codes in the specific execution context.

14. The method of claim 9, wherein the control unit is a hypervisor or a common operating system.

15. The method of claim 9, further comprising implementing the method using a computer program comprising executable instructions that, when executed by the control unit, carry out the method.

16. The method of claim 15, wherein the computer program is stored in a non-transitory computer-readable medium.

* * * * *